Aug. 29, 1961 J. ZAGORSKI 2,998,035
DEVICE FOR STUFFING A TUBE
Filed March 20, 1958 3 Sheets-Sheet 1

Inventor:
Johan Zagorski
by:
Michael S. Striker
Attorney

Aug. 29, 1961   J. ZAGORSKI   2,998,035
DEVICE FOR STUFFING A TUBE
Filed March 20, 1958   3 Sheets-Sheet 3

Inventor:
Johann Zagorski
by: Michael S. Striker
Attorney

United States Patent Office 2,998,035
Patented Aug. 29, 1961

2,998,035
DEVICE FOR STUFFING A TUBE
Johann Zagorski, Titlgasse 14, Vienna XIII, Austria
Filed Mar. 20, 1958, Ser. No. 722,813
Claims priority, application Austria Feb. 15, 1954
13 Claims. (Cl. 141—10)

The present invention relates to a method and device for making a prepared stuffing box packing in cord form. A flexible tubing is filled with pulverulent masses, such as graphite, talc or the like, and fibres, such as asbestos, cotton or synthetic fibres. The present application is a continuation-in-part- application of my copending application Serial Number 485,968 filed February 3, 1955, now abandoned.

The method of preparing the stuffing box packing comprises the mixing of a sealing mass containing fibres, asbestos, cotton, or synthetic fibres and at least one element of the group consisting of pulverulent, graphite, talc and soot in dry state and thereupon filling said mass successively and intermittently in small amounts and with little pressure into a fabric tubing by means of a filling funnel provided with a long filling tube and a plunger being introduced by hand through the funnel into the filling tube. The fabric tubing is closed at the bottom and being pulled with cross-folds over the filling tube at the beginning of the filling operation and is successively pushed off the filling tube as it is being filled. By this method it is possible to prepare a stuffing box packing cord in form of a filled tubing, which is very soft, so that the packing is adapted to be inserted easily in stuffing boxes of different shapes.

The device for preparing the packing according to the invention comprises an upright filling tube having an upper filling end and a lower discharge end; means for frictionally holding a transversely gathered folded tubing having a closed end on the outside of the filling tube with the closed end spaced from the discharge end of the filling tube; and a plunger having a length greater than the length of the filling tube and adapted to be inserted into the same to a position in which one end of the plunger projects beyond the discharge end of the filling tube and into the tubing whereby small quantities of pulverulent mass successively inserted through the filling end of the tube can be uniformly stuffed into the tubing by the plunger while the closed end of the tubing moves away from the discharge end of the filling tube. In this manner small amounts of the pulverulent sealing mass are pushed with little pressure through said filling funnel and tube into the tubing.

The drawing shows a device for preparing the new stuffing box packing and illustrates further advantageous embodiments.

Figures 1, 2:
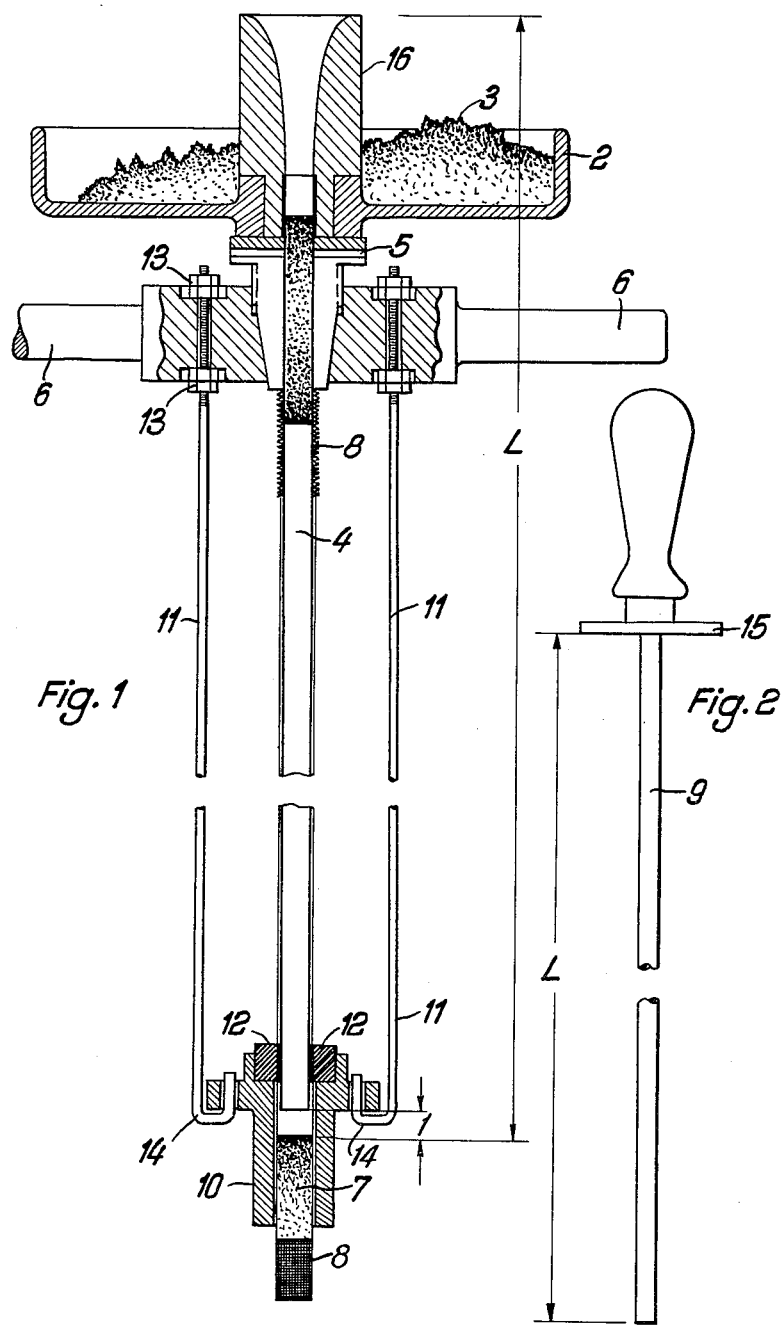
FIG. 1 shows a filling device for filling a fabric tubing in section.
FIG. 2 is a side view of a plunger for the device of FIG. 1.

In FIG. 1 a hopper 16 of metal is turnably and removably i.e. exchangeably, supported in a central hub of a metal cup 2 receiving a supply of the sealing mass 3 as described above. The hopper 16 is turnably and removably and consequently exchangeably mounted on the upper end of a filling tube 4 of metal, the hopper 16 having an inside diameter equal to the inner diameter of the filling tube 4.

Figure 3:
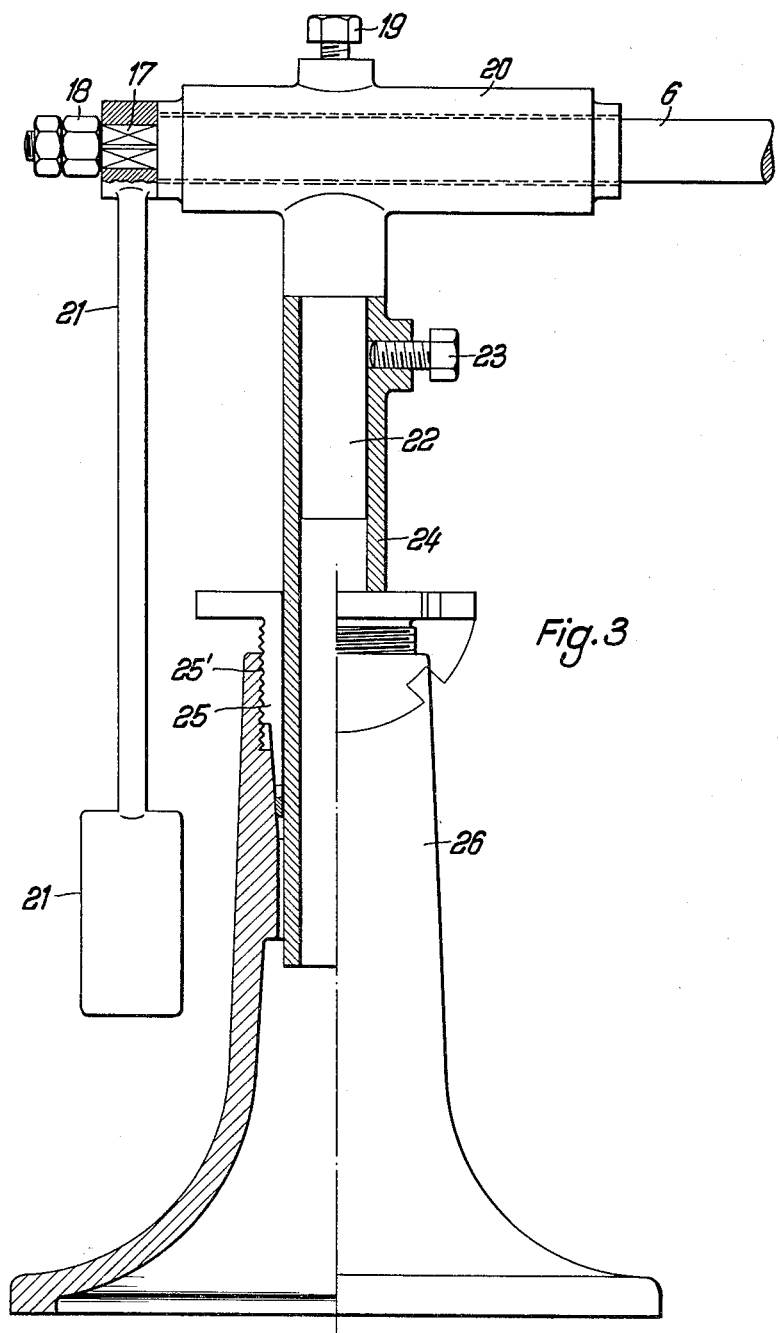
FIG. 3 shows a support for one filling device, seen from the side, partly in section, and is a continuation of the left part of FIG. 1 on a larger scale.

The tube 4 is clamped to a turnable horizontal arm 6 by means of a longitudinally slotted member 5 having a conical thread. Arm or trunnion 6 is pivoted by a vertical pivot 22 of a support head 20 and is swingable about said vertical pivot, as shown in FIG. 3. A tubular guide member 10 containing an inserted rubber ring 12 and surrounding the lower end of the tube 4 is detachably suspended from the trunnion 6 by means of wire rods 11 provided with hooks 14 at their bottom portion and with nuts 13 at their upper end. A fabric tubing 8 of thin yarn of asbestos-, cotton-, or synthetic fibres or the like is gathered with cross-folds over the tube 4, the tubing being closed at the bottom by sewing or the like and being considerably longer than the tube 4 and being pushed onto this tube upwardly, forming said cross-folds. The rubber ring 12 which also may be a spring ring holds the tubing 8 frictionally and with little pressure on the tube. A plunger 9 of a length L being a small amount 1 greater than the length of the tube 4 and the hopper 16, with a handle and a stop 15 serves for stuffing the sealing mass from the hopper 16 into the tube 4. The parts in FIGS. 1 and 2 indicated by an arrow L to have the same length L, are shown partly broken away so that the distances L are not the same in FIG. 1 and FIG. 2.

According to FIG. 3 the trunnion 6 is turnably mounted in the support head 20 which is provided with a bearing. As shown in FIG. 3, a weight 21' with a lever 21 mounted on a portion 17 of the trunnion 6 by nuts 18 holds the tube 4 in an approximately vertical direction. Portion 17 has a square cross-section. A set screw 19 may be provided in the support head to hold the trunnion 6 in the same angular adjustment. The weight 21' with lever 21 then may be omitted.

The support head 20 has a pivot 22 projecting into a telescopic tubular member 24, so as to enable the pivot 22 (with head 20) to be turned about its axis. The pivot 22 may be fixed by a set screw 23 in any position. The telescopic tube 24 projects through the axial bore of a longitudinally slotted threaded member 25 which has a conical thread into a support 26, in which said member may be screwed into a conical thread 25' of the support, so as to clamp said telescopic tube 24 in any desired height.

In another embodiment of the invention (accordingly thickened), pivot 22 is directly mounted in said nut 25, whereby the telescopic tube 24 with the adjusting screw 23 may be saved, because the pivot 22 may be brought and held in any desired position by means of the nut 25.

Figure 4:
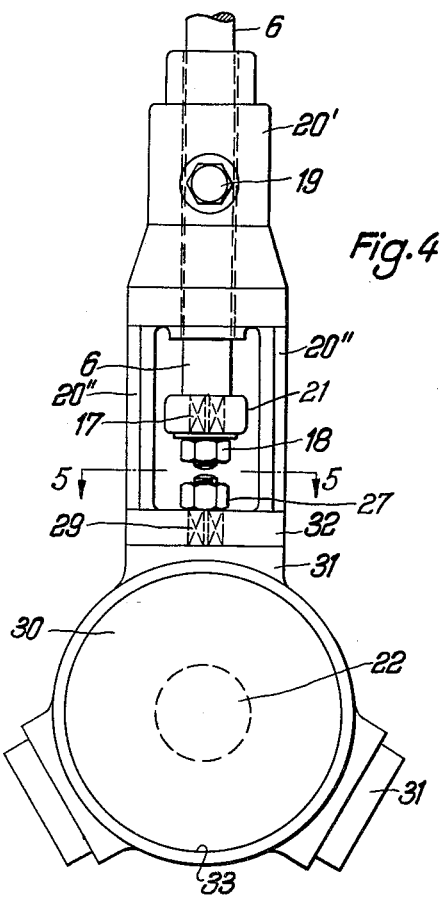
FIG. 4 shows a plan view of a head of another support according to a modified embodiment.
Figure 5:
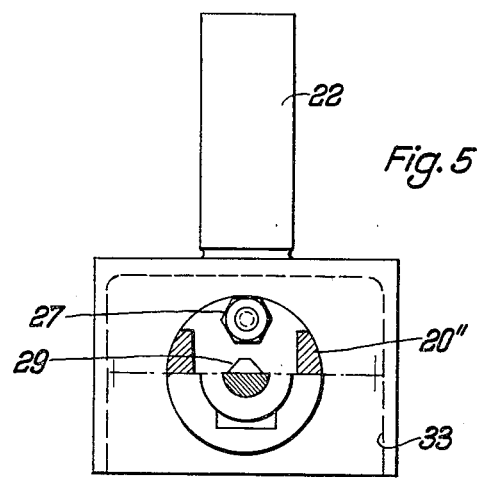
FIG. 5 shows a side view of the device, partly in section.

According to FIGS. 4 and 5 more than one arm 6 are mounted on the support 26 by means of a special support head 30 which has a pivot 22 turnably mounted in tube 24 as shown in FIG. 3 for the pivot 22 of the head 20. The head 30 has three bearings 20' on bearing arms 20" whose connecting flanges 32 are secured to abutments 31 of the head 30 by means of bolts and nuts 27. Levers 21 having weights 21' may be provided on the trunnions 6 as described in the reference to FIG. 3. Set screws 19 may also be provided.

Within the flanges 32 square holes 29 are provided in longitudinal alignment with arms 6, so that after removing of the levers 21 the prismatic portions 17 of the trunnions 6 can be pushed into the square-holes 29, so as to hold the trunnions 6 non-rotatable and thereby the tubes 4 in the desired vertical direction. The head 30 may contain in its upper side a cup 33 so as to receive tools or the like.

The three arms C of head 30 permit three men to work at the same time and to fill tubings of different diameters by means of devices as shown in FIG. 1 and mounted on each arm 6 of head 30.

In operation, a small amount of sealing mass 3 is filled into the topper 16 and, thereupon, pushed into the tube 4 by plunger 9 or by a corresponding shorter plunger, forming a portion 7 of sealing mass, which is pushed by means of the plunger 9 into the woven tubing 8, whereby the tubing 8 on account of the pressure of the plunger 9 exerted through the filled-in mass on the closed end of the tubing, is moved through the nozzle 10 a distance equal to the length of the portion 7. The plunger projects beyond the tube 4 only by the small amount 1, and its end is located in tubular guide member 10 so as to avoid damaging of the tubing 8 by the plunger 9. The pressure of the sealing mass 7 in the tubing 8 only slightly exceeds the frictional resistance between the tubing 8 and the ring 12 and the tube 4 respectively, plus the frictional resistance of the sealing mass in the tube during the pushing of the quantity 7 through the tube 4 and is consequently small. Thus the finished tubing packing is not too firmly packed and can be easily deformed. The finished tubing packing is closed by sewing or tying up at the filling end.

For the filling of thick tubings it is advantageous to employ the lever 21 with the weight 21' for turning tube 4 in the desired direction whereby tube 4 extends inclined to the vertical line, so that a long stuffed tube 8 is not buckled at the discharge end of the filling tube when the filled part of the tubing rests on the floor while its portion adjacent the filling tube is being stuffed.

The fabric tubing may be impregnated with a liquid containing diluted grease and graphite, or grease and talc to improve its density and durability. The sealing mass itself may contain a liquid which, even after drying, is not tacky.

It is understood that variations equivalent to the described method and device should be included in the range of the following claims:

What is claimed as new and desired to be secured by Letters Patent is:

1. A method for making a stuffing box packing, comprising the steps of mixing a mass of pulverulent material and fibers; frictionally holding a transversely gathered tubing closed at one end on an upright filling tube located in said tubing and having a discharge end confronting said closed end of said tubing; successively placing small quantities of the mass in the other end of said filling tube and successively pushing by a plunger longer than said filling tube each small quantity of said mass from the other end of said filling tube beyond said discharge end of said filling tube directly into said closed end of said tubing and completely removing said plunger from said filling tube before introducing another small quantity of said mass into said other end of said filling tube; and rigidly constraining to cylindrical shape a portion of said tubing adjacent said discharge end of said filling tube whereby said tubing is gradually uniformly stuffed while said closed end thereof moves away from said one end of said filling tube and is prevented from breaking adjacent said discharge end of said filling tube when said one end of said tubing is transversely displaced.

2. A device for making a stuffing box packing, comprising, in combination, an upright filling tube having an upper filling end and a lower discharge end; means for frictionally holding a transversely gathered folded tubing having a closed end on the outside of said filling tube with said closed end located at said discharge end of said filling tube; a manually operated plunger having a length greater than the length of said filling tube and adapted to be inserted into the same to a position in which one end of said plunger projects beyond said discharge end of said filling tube and into said tubing, said plunger being retractable to a position located outside of said filling tube so that a small quantity of a pulverulent mass can be inserted through said filling end; and a tubular guide member having an inner surface surrounding said discharge end of said tube and projecting downwardly beyond the same and adapted to surround a portion of said tubing for preventing undesired expansion of the same whereby small quantities of pulverulent mass successively inserted through said filling end of said tube can be uniformly stuffed directly into said surrounded portion of said tubing by said plunger while said closed end of said tubing moves away from said discharge end of said filling tube.

3. A device for making a stuffing box packing, comprising, in combination, an upright filling tube having an upper filling end and a lower discharge end; a hopper coaxial with said filling tube detachably attached to said filling end of said filling tube and having an inner guide surface merging into the inner surface of said filling tube; supporting means for supporting said filling tube and said hopper for pivotal movement about a horizontal axis so that said filling tube can be turned between a vertical position and inclined positions; means for frictionally holding a transversely gathered folded tubing having a closed end on the outside of said filling tube with said closed end located at said discharge end of said filling tube; a manually operated plunger having a length greater than the length of said filling tube and said hopper and adapted to be inserted into the same to a position in which one end of said plunger projects beyond said discharge end of said filling tube and into said tubing, said plunger being retractable to a position located outside of said filling tube so that a small quantity of a pulverulent mass can be inserted through said hopper into said filling end of said tube; and a tubular guide member having an inner cylindrical surface surrounding said discharge end of said tube and projecting downwardly beyond the same and adapted to surround a portion of said tubing for preventing undesired expansion of the same, said guide member being rigid and suspended from said supporting means whereby small quantities of pulverulent mass successively inserted through said filling end of said tube can be uniformly stuffed directly into said surrounded portion of said tubing by said plunger while said closed end of said tubing moves away from said discharge end of said filling tube.

4. A device as set forth in claim 3 wherein said supporting means includes an upright supporting member, a transverse arm mounted on said supporting member for turning movement about a horizontal axis and supporting said tube, and means for securing and holding said arm in turned positions in which said filling tube is respectively vertical or inclined.

5. A device as set forth in claim 4 wherein said supporting means include means for supporting said transverse arm on said supporting member for turning movement about a vertical axis.

6. A device as set forth in claim 4 wherein said guide member has at the upper end thereof a flange, wherein said means for frictionally holding said tubing is a rubber ring supported on said flange of said guide member; and including a pair of suspending rods detachably attached to said flange and to said arm.

7. A device as set forth in claim 3 and including an annular trough member supported on said supporting means and surrounding said hopper, said trough member being adapted to hold a supply of said mass.

8. A device as set forth in claim 3 wherein said supporting means has a threaded bore of conical shape surrounding said filling tube; and including a threaded conical member having an axial bore surrounding said filling tube and having axial slots, said threaded member being screwed into said threaded bore and supporting said hopper, said filling tube being clamped by said threaded member screwed into said threaded bore.

9. A device as set forth in claim 3 wherein said supporting means includes an upright supporting member, a transverse arm mounted on said supporting member for turning movement about a horizontal axis and supporting said tube, weight means suspended from said transverse arm and tending to turn the same to a position in which said tube is vertical, and means for securing and holding said arm in turned positions in which said filling tube is respectively vertical or inclined.

10. A device as set forth in claim 9 wherein said supporting member includes a head member having a horizontal bearing bore, and wherein said transverse arm includes a horizontal shaft turnably mounted in said horizontal bearing bore; wherein said means for securing include a set screw threaded into said head member for securing said horizontal shaft in turned positions, and wherein said weight means includes a weighted lever secured to said horizontal shaft and extending parallel to said filling tube so as to tend to hold said filling tube in a vertical position.

11. A device as set forth in claim 10 wherein said head member includes a vertical pivot; wherein said supporting member includes an upright tubular member having a conical threaded bore, a telescopic tube telescopically slidable in said upright tubular member and turnably supporting said pivot for turning movement about a vertical axis, screw means threaded into said telescopic tube for securing said pivot to the same in turned positions, a threaded member having an axial bore surrounding said telescopic tube, and having axial slots, said threaded member having a conical outer thread for clamping said telescopic tube to said upright tubular member when said threaded member is screwed into said threaded bore of said upright tubular member.

12. A device as set forth in claim 3 wherein said supporting means include an upright supporting member, a head member turnably supported on said supporting member for turning movement about a vertical axis, a plurality of radially extending brackets secured to said head member, each bracket having two parallel arms and inner and outer end members, the inner end member being attached to said head member, and the outer end member having a horizontal bearing bore, a plurality of horizontal shafts mounted in said horizontal bearing bores, respectively, and having inner portions located between said arms, and outer portions, one of said outer portions supporting said filling tube; other filling tubes supported on the other arms; a weight lever secured to each inner portion and extending parallel to the respective filling tube and tending to hold said filling tube in a vertical position, and set screw means for securing each of said horizontal shafts in turned positions to said outer end members of said brackets.

13. A device as set forth in claim 12 wherein each horizontal shaft is shiftable in said horizontal bearing bore in axial direction and has an inner end portion of square cross-sectional shape, and wherein said inner end members have recesses of square cross-section matching said inner portions of said shafts for non-turnably holding axially shifted horizontal shafts.

References Cited in the file of this patent

UNITED STATES PATENTS

| | | |
|---|---|---|
| 1,114,256 | Gwinn | Oct. 20, 1914 |
| 1,693,261 | Sweetland | Nov. 27, 1928 |

FOREIGN PATENTS

| | | |
|---|---|---|
| 342,934 | Great Britain | Feb. 12, 1931 |